May 26, 1970  G. J. O. WELIN-BERGER  3,514,361
METHOD AND MACHINE FOR INTERCONNECTING
TWO WEBS OF PAPER OR THE LIKE
Filed May 2, 1966
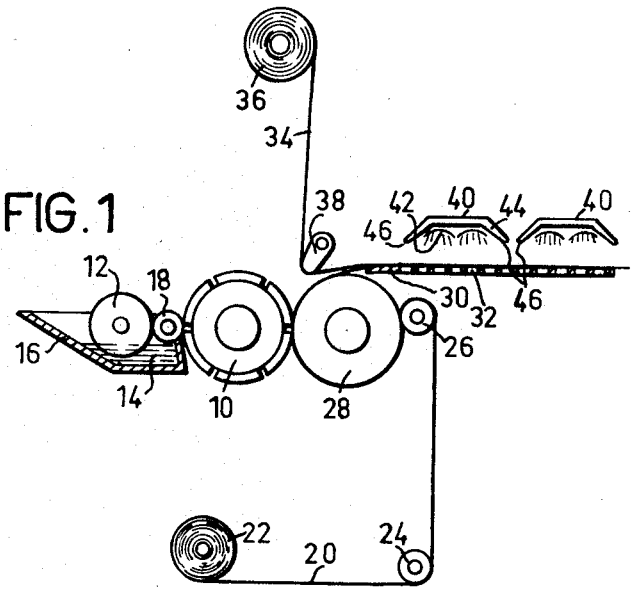
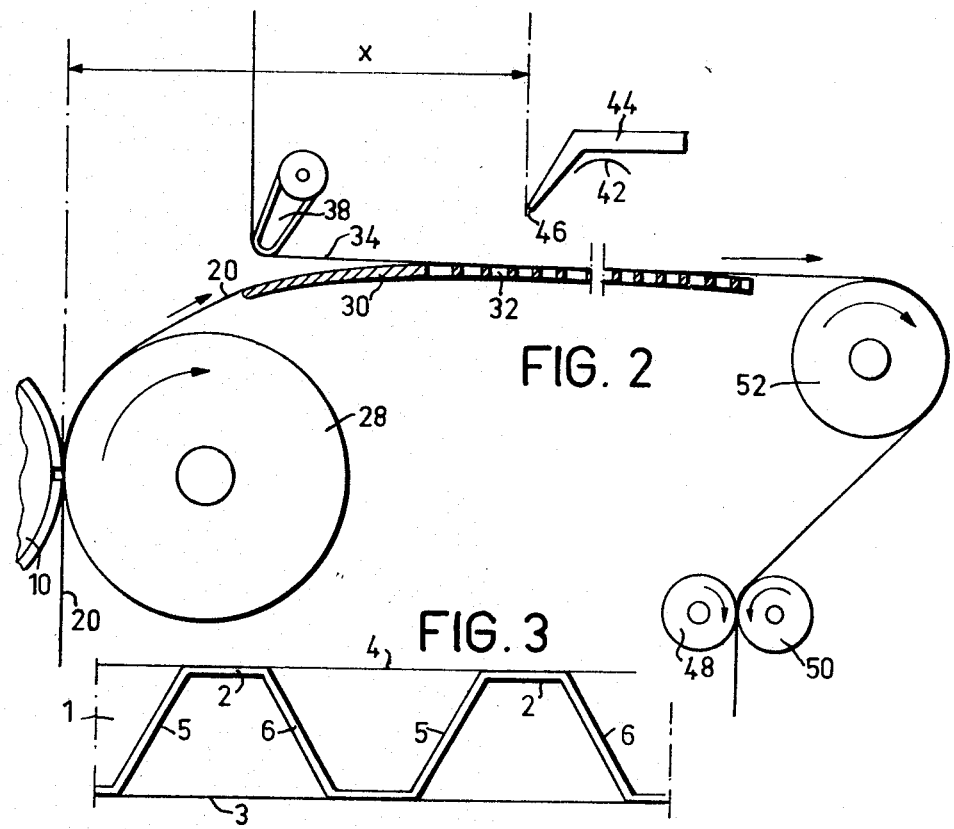
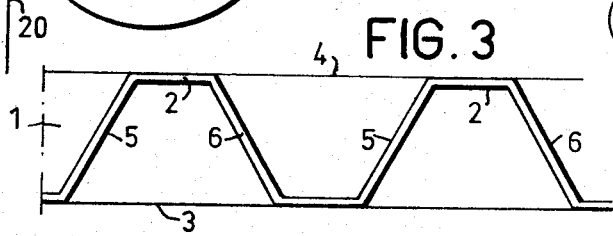
INVENTOR.
Guy John Olof Welin-Berger
BY
Young & Thompson
ATTYS.

United States Patent Office 3,514,361
Patented May 26, 1970

3,514,361
METHOD AND MACHINE FOR INTERCONNECTING TWO WEBS OF PAPER OR THE LIKE
Guy John Olof Welin-Berger, Parkgrand 4, Nacka, Sweden
Filed May 2, 1966, Ser. No. 546,947
Claims priority, application Sweden, May 4, 1965, 5,835/65
Int. Cl. B27g 11/00; B32b 7/14
U.S. Cl. 156—497    5 Claims

ABSTRACT OF THE DISCLOSURE

In a machine for interconnecting webs of porous paper for making filtering bags and similar articles, a stationary guide means has a curved guide surface of great radius of curvature as compared with that of other guide means of the machine and is adapted to receive one web. A printing roller for applying adhesive to the web and a counter roller for the printing roller deliver the web to the stationary guide means, and a guide member for a further web guides this latter web substantially along a tangent to the curved guide surface. Thus, the webs are brought together successively without material pressure between the webs, whereby spreading of the adhesive is avoided.

---

This invention relates to the manufacturing of articles, such as filtering bags or the like for brewing coffee, which can be made from two layers of paper or the like put together and glued together along predetermined defined surfaces corresponding to the shape or contour of the article. The invention relates to a machine which can be employed especially well in mass production of such articles.

In its broadest aspect the operation of the machine according to the invention is characterized in that adhesive is applied to at least one of a pair of webs or for instance paper from which the article in question is to be made said adhesive being applied along stripes corresponding to the shape or contour or part thereof of the article, whereupon the webs are brought together while moving in their longitudinal directions so as to connect them to each other along the adhesive-coated stripes. In order to ensure exact application of the adhesive along the desired stripes, an additional feature of the invention comprises applying the adhesive by printing. The adhesive can be applied quickly and accurately by passing one of the webs between a block or pattern roller provided with adhesive and a counter roller so as to apply the adhesive by rotary printing resulting in a rapid production with high capacity. It is especially important to prevent the adhesive from dispersing outside the surfaces to which it is applied on the paper. Such dispersion is prevented by bringing the webs successively together without subjecting them prior to the drying of the adhesive, to material pressure at right angles to their planes.

A machine embodying the invention is characterized in its broadest aspect by a block or pattern roller for printing stripes of adhesive on one of two webs of for instance porous paper, which webs are to be brought together and connected to each other along said stripes, and by a device for successively bringing the webs together without material pressure thereon at right angles to the plane of the webs.

Additional features of the invention and advantages obtained thereby will appear from the following description of an embodiment illustrated in the accompanying drawing. FIG. 1 is a diagrammatic view of the essential parts of a machine according to the invention. FIG. 2 is an enlarged view of a device comprised in the machine for bringing the two webs together. FIG. 3 is a plan view of part of a web to which adhesive has been applied.

In the example illustrated in FIG. 3 a web 1 of for instance filtering paper is provided with adhesive stripes consisting of a plurality of stripes 2 which extend substantially parallel to the longitudinal edges 3, 4 of the web and of a plurality of oblique stripes 5, 6 which extend between the stripes 2. The stripes 2 are to be located at the bottom of the finished filtering bag whereas the stripes 5 and 6 are to be located at the lateral edges of the bag. At the longitudinal edge of the web opposite to the bottom stripe the web has no adhesive stripe, and this edge is to define the top opening of the bag. In the first place the method consists in that such a web provided with adhesive stripes is brought together with another web which preferably is not coated with adhesive, while the webs are advanced in their longitudinal directions so as to be connected to each other along the adhesive stripes. Thereafter bags can be cut or stamped from the interconnected webs along the adhesive stripes.

In order to ensure a quick and rational production and an accurate application of the adhesive stripes this application may be effected by printing, especially rotary printing. A machine for this purpose is illustrated in FIG. 1.

The machine shown in FIG. 1 comprises a block or pattern roller 10 having elevated portions corresponding to the pattern of the stripes 2, 5 and 6. Adhesive is supplied to this roller by a gluing device which for instance may comprise a roller 12 which receives adhesive 14 from a tray 16 and transfers the adhesive to an adhesive-applying roller 18 which rotates in engagement with the block roller 10. The web 20, for instance of filtering paper, to which adhesive is to be applied is taken from a supply roller 22 and passes over a pair of guide rollers 24, 26 and under a counterroller 28 of the block roller 10. The web passes between the block roller and the counterroller so that adhesive is applied to the web along the predetermined stripes whereupon the web is received on a guide surface 30 the first part of which is imperforate and the following part of which is in the form of a grating 32 on which the web passes. The other web 34 is taken from a supply roller 36 and passes under a cam-like guide member 38 from which the web 34 after having changed its direction is moved to the guide surface 30 onto the web 20 so as to be brought together therewith. The webs are successively brought together without being subjected to material pressure at right angles to the plane of the webs, this being important to prevent adhesive from being squeezed out laterally and dispersing outside the predetermined stripes.

FIG. 2 illustrates on an enlarged scale how the webs can be successively brought together. The guide plate or guide surface 30 and the grating 32 are slightly curved and convex toward the upper web 34. The web 20 is advanced in contact with the guide plate 30 and the grating 32 and is consequently slightly curved when it is brought together with the other web 34. This web 34 passes from the guide member 38 along a tangent to the curved web 20 and the guide plate 30 and grating 32. Due to this arrangement the webs will be successively brought together and will not be pressed together but only lightly placed one upon the other.

To obtain an effective connection of the webs along the predetermined surfaces it is of importance that the adhesive which has been applied to the web 20 only also be absorbed by the other web 34. In order to facilitate this absorption which starts due to the capillarly forces in the porous paper webs and in order to dry the adhesive quickly, the webs are subjected to the action of heat while they are being brought together. Heat is also supplied to the web 34 which has not been provided with adhesive. In addition, drying air is blown toward this web. To this end, several hoods 40 are provided above the webs. Disposed in these hoods are sources 42 of radiant heat, for instance for directing infrared radiation onto the webs. The hoods are double-walled and air under pressure is admitted to the intermediate spaces 44 and flows toward the webs through slots 46 at the lower edges of the hoods.

It is important to have the heating and drying device disposed at a sufficiently great distance $x$ from the block roller and counterroller and to have the webs brought together at a sufficient distance from the rollers so as to prevent the rollers from being heated and to prevent the adhesive from being heated and consequently changed.

By controlling the supply of heat and air to the webs in relation to the speed of the webs the absorption of adhesive from the web 20 to the web 34 can be influenced. It is desirable to effect the control such that the web 34 and the web 20 have received equal amounts of adhesive after they have passed the drying device and are advanced onto a guide roller 52.

While the webs 20 and 34 are brought together they are kept under a certain small tension due to the fact that they are dragged along the guide plate 30 and the grating 32 by means of a pair of feed rollers 48, 50 arranged after the guide roller 52. The upper web 34 is braked to a certain degree while it drags on the cam-like guide member 38, whereas the lower web is braked by the guide rollers and the counterroller. If required, special braking members may be provided on some of the rollers.

The invention is not limited to the illustrated and described embodiment of the machine and the method. For instance rotary printing may be replaced by printing with a reciprocating stamp and a corresponding dye over which one of the paper webs is moved step by step. However, rotary printing usually renders possible a more rapid production.

What I claim is:

1. A machine for interconnecting webs of porous paper for making filtering bags and the like, comprising a roller for printing stripes of adhesive on one web, a stationary guide member having a curved stationary guide surface adapted to receive said web, a counter roller for said printing roller, said counter roller delivering the web to said guide surface, and a further guide member spaced apart from said stationary guide member for guiding a further web substantially along a tangent to said guide surface for progressively bringing the webs together, said stationary guide member being the sole member contacting and pressing together the webs when said one web is in contact with said stationary guide surface and said webs are together.

2. A machine as claimed in claim 1, and a pair of draw rollers after the guide surface for pulling the webs over the guide surface.

3. A machine as claimed in claim 1, and means for supplying heat and drying air to the webs while and after they are brought together, said means being spaced from the printing roller and the counter roller.

4. A machine as claimed in claim 1, the portion of said guide surface first contacted by the first-mentioned web being imperforate and the portion of said guide surface last contacted by the first-mentioned web being multiperforate.

5. A machine as claimed in claim 4, and means for heating that portion of the interconnected webs which is in contact with said multiperforate portion of said guide surface.

References Cited

UNITED STATES PATENTS 2,224,370  12/1940  Wescott _____ 156—498 XR

JOHN T. GOOLKASIAN, Primary Examiner

GEORGE W. MOXON II, Assistant Examiner

U.S. Cl. X.R.

156—277, 291, 548